United States Patent
Wang et al.

(10) Patent No.: US 9,935,299 B2
(45) Date of Patent: Apr. 3, 2018

(54) COIN CELL AND METHOD FOR PRODUCING SUCH COIN CELL

(71) Applicant: RENATA AG, Itingen (CH)

(72) Inventors: Xiaojun Wang, Olten (CH); Marcel Guldimann, Boeckten (CH); Pascal Haering, Muttenz (CH)

(73) Assignee: Renata AG, Itingen (CH)

( * ) Notice: Subject to any disclaimer, the term of this patent is extended or adjusted under 35 U.S.C. 154(b) by 64 days.

(21) Appl. No.: 15/228,405

(22) Filed: Aug. 4, 2016

(65) Prior Publication Data
US 2017/0069880 A1 Mar. 9, 2017

(30) Foreign Application Priority Data
Sep. 4, 2015 (EP) ...................................... 15183945

(51) Int. Cl.
H01M 2/02 (2006.01)
H01M 10/04 (2006.01)
(Continued)

(52) U.S. Cl.
CPC ........... *H01M 2/0222* (2013.01); *H01M 2/24* (2013.01); *H01M 10/0422* (2013.01);
(Continued)

(58) Field of Classification Search
CPC .. H01M 2/0222; H01M 10/0422; H01M 2/24; H01M 10/0427
See application file for complete search history.

(56) References Cited

U.S. PATENT DOCUMENTS

| | | | |
|---|---|---|---|
| 3,907,599 A | 9/1975 | Fanciullo et al. | |
| 2016/0099481 A1* | 4/2016 | Akagawa | H01M 4/485 429/185 |
| 2017/0047559 A1* | 2/2017 | Yoo | H01M 10/0463 |

FOREIGN PATENT DOCUMENTS

| | | |
|---|---|---|
| EP | 2 610 945 A1 | 7/2013 |
| JP | 2011-81941 | 4/2011 |

(Continued)

*Primary Examiner* — Stewart A Fraser
(74) *Attorney, Agent, or Firm* — Oblon, McClelland, Maier & Neustadt, L.L.P.

(57) ABSTRACT

The invention relates to a coin cell (200) comprising two cases (201, 208) designed to form a housing, an assembly of stacked electrodes placed inside the housing and comprising at least one positive electrode (203), at least one negative electrode (204, 204', 204"), and at least one separator (202) placed in-between them. It further comprises a insulating packing tape (205) comprising an insulator basis (205*a*) and at least one packing flap (205*b*) integral with the insulator basis (205*a*), said insulating packing tape (205) being placed in such a way that the insulator basis (205*a*) is between the assembly of stacked electrodes and one of the cases (208) to avoid electrical contact between the assembly of stacked electrodes and said case (208) and the packing flap (205*b*) holds the assembly of stacked electrodes to form an electrode pack (209).

The invention relates also to a method for producing such a coin cell (200), comprising the step of:
- stacking together alternatively a positive electrode (203) and a negative electrode (204', 204, 204") by placing a separator (202) in-between them to form an assembly of stacked electrodes,
- packing the assembly of stacked electrodes with said insulating packing tape (205),
- filling said obtained assembly of stacked electrodes with electrolyte, (Continued)

placing the obtained assembly of stacked electrodes in the cases (201, 208), assembling the cases (201, 208).

18 Claims, 3 Drawing Sheets

(51) Int. Cl.
*H01M 2/24* (2006.01)
*H01M 10/0525* (2010.01)
*H01M 10/0585* (2010.01)

(52) U.S. Cl.
CPC .... *H01M 10/0427* (2013.01); *H01M 10/0525* (2013.01); *H01M 10/0585* (2013.01); *H01M 2220/30* (2013.01)

(56) References Cited

FOREIGN PATENT DOCUMENTS

| | | |
|---|---|---|
| JP | 2015-133292 | 7/2015 |
| WO | WO 2014/010396 A1 | 1/2014 |

* cited by examiner

COIN CELL AND METHOD FOR PRODUCING SUCH COIN CELL

This application claims priority from European Patent application 15183945.3 of Sep. 4, 2015, the entire disclosure of which is hereby incorporated herein by reference.

FIELD OF THE INVENTION

The present invention relates to a coin cell comprising two cases designed to form a housing, an assembly of stacked electrodes placed inside the housing and comprising at least one positive electrode, at least one negative electrode, and at least one separator placed in-between them. The invention relates also to a method for producing such coin cell.

BACKGROUND OF THE INVENTION

Recent developments on portable and wearable electronic devices are requiring minimized power supplier system, namely the battery which can provide high volumetric energy and power density. Electrode stack is a promising design that satisfies the requirements of such type of battery. A stacked battery including a stack of positive and negative electrodes is conventionally known. A separator is provided between the positive and negative electrodes to avoid a short circuit from occurring between said positive and negative electrodes and also to allow sufficient ionic conductivity between negative and positive electrodes. Such a cell including an assembly of stacked electrodes is disclosed for example in patent U.S. Pat. No. 3,907,599 or in patent publication EP 2610945. The assembly of stacked electrodes is connected to an external circuitry via contact tabs protruding from the positive and negative electrodes respectively.

When stacking electrode pieces, people have to face the challenges of terminal tabs design, packing, and followed by manufacturing them.

Traditionally after the stacking process of electrodes, packing tapes are applied around the assembly of stacked electrodes to hold the whole electrode stack. Besides, in order to avoid short circuit between electrode current collector and metallic case of the cell, an insulation foil is placed in-between. Both the packing tape and insulator foil are made of electronic inert polymer. A drawback of such known arrangement is that the risk of electrolyte leakage increases significantly since the insulation foil and the welded cathode tabs are placed under the gasket. Another drawback of such arrangement is that at least two different forms of polymer for the packing tape and for the insulation foil are required. Moreover, it needs people to concern about avoiding displacement of insulation foil from electrodes, the design freedom of contact tabs, etc. In addition, different forms of tape lead to multiple steps during manufacturing process.

It is therefore necessary to propose a new coin cell with stacked electrodes which is less complex and costly to manufacture and which is not subject to the limitations of known stacked cells.

SUMMARY OF THE INVENTION

To this end, the present invention relates to a coin cell comprising two cases designed to form a housing, an assembly of stacked electrodes placed inside the housing and comprising at least one positive electrode, at least one negative electrode, and at least one separator placed in-between them.

According to the invention, the coin cell further comprises an insulating packing tape comprising an insulator basis and at least one packing flap integral with (or attached to) the insulator basis, said insulating packing tape being placed in such a way that the insulator basis is between the assembly of stacked electrodes and one of the cases to avoid electrical contact between the assembly of stacked electrodes and said case and the packing flap holds the assembly of stacked electrodes to form an electrode pack.

Advantageously, at least the packing flap may comprise an adhesive layer facing the assembly of stacked electrodes.

In a preferred embodiment, the insulator basis and the packing flap may form one piece.

In a preferred embodiment, the insulating packing tape may comprise at least two packing flaps extending from either side of the insulator basis, preferably symmetrically, said packing flaps being folded along the height of the assembly of stacked electrodes and folded back against said assembly of stacked electrodes to hold it.

Advantageously, the insulator basis may have a larger area than a facing electrode of the assembly of stacked electrodes.

In a preferred embodiment, the coin cell may further comprise a contact element placed between the insulating packing tape and the case which is adjacent to said insulating packing tape, said contact element leading contact between at least one of the positive or negative electrodes to said case.

The present invention relates also to a method for producing a coin cell as defined above, comprising the step of:
stacking together alternatively a positive electrode and a negative electrode by placing a separator in-between them to form an assembly of stacked electrodes,
packing the assembly of stacked electrodes with said insulating packing tape,
filling said obtained assembly of stacked electrodes with electrolyte,
placing the obtained assembly of stacked electrodes in the cases,
assembling the cases.

Preferably, the packing step may comprise a step of placing the insulator basis of the insulating packing tape facing an end electrode of the assembly of stacked electrodes and a step of folding the packing flap of the insulating packing tape along the height of the assembly of stacked electrodes and back against said assembly of stacked electrodes to hold it.

The obtained coin cell with stacked electrodes is less complex and easier to manufacture than the known coin cells. Moreover, the insulating packing tape allows to isolate the assembly of stacked electrodes from the gasket, in such a way that it has more secured anti-leakage. The insulating packing tape used in the invention is a reliable and safe element in the coin cell.

BRIEF DESCRIPTION OF THE DRAWINGS

The aims, advantages and features of the present invention will appear more clearly in the following detailed description of at least one embodiment of the invention, given solely by way of example, in a non-limiting manner and illustrated by the annexed drawings in which.

DETAILED DESCRIPTION OF THE INVENTION

Figure 1:
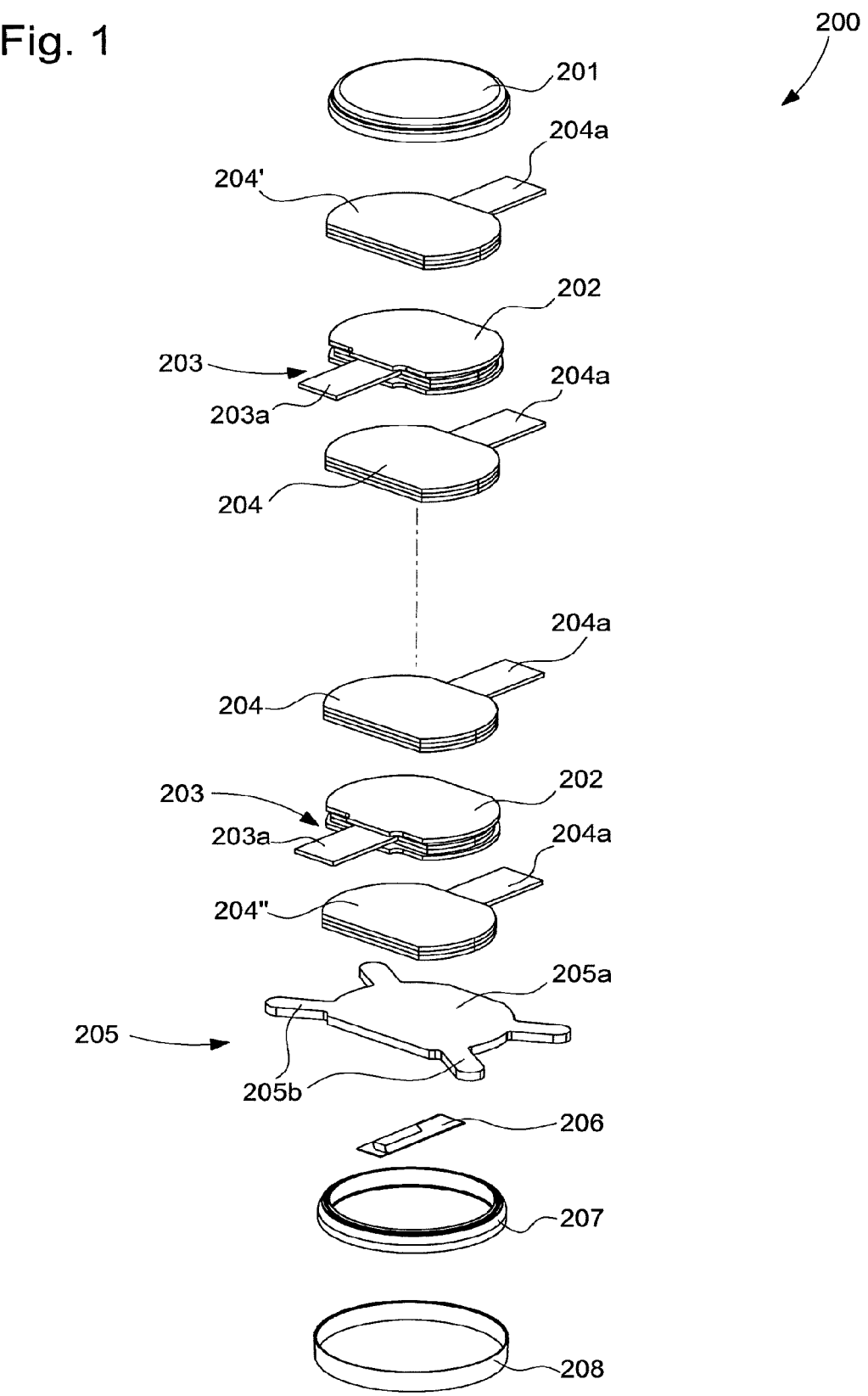
FIG. 1 illustrates schematically an exploded view of a coin cell according to the invention.

Referring to FIG. 1, the coin cell 200 of the invention comprises two metallic cases, more specifically a lid 201 corresponding to the negative electrode case, and a cup 208, corresponding to the positive electrode case. When the lid 201 and the cup 208 have been assembled, they form between each other a housing 210 inside which an assembly of stacked electrodes is placed. A gasket 207 is sandwiched between the lid 201 and the cup 208, the lid 201 having been pressed into said gasket 207.

Lithium battery consists of three fundamental components, negative electrode 204 (anode), electrolyte and positive electrode 203 (cathode). Lithium metal or Lithium contained alloy, graphite-like materials, metal oxide, sulphide, nitride etc. that have low reduction potential can be used as active anode materials. Generally lithium salt dissolving in no aqueous system is used as electrolyte, gel-like electrolyte is applied in lithium polymer battery and solid electrolyte can be used in solid-state lithium battery. Cathodes are the compounds that can take the lithium ions into the structure along with electrochemical reaction and meanwhile produce energy. Compounds such as sulphur, metal oxide, sulphide, phosphate, silicate etc. can be used as cathode active materials.

The staked electrode construction is applied in lithium battery with high power performance. To achieve this goal, cathode and anode materials are coated on metallic foil or mesh, and then stacked together alternatively. Separator 202 is placed in-between them. The materials of separator can be chosen as polymer with porous structure, such as Polyethylene (PE), Polypropylene (PP), Polyvinylidene fluorides (PVDF), Polyethylene terephthalates (PET) or mix two or more thereof. Electrolyte is filled into the stacked electrodes.

The assembly of stacked electrodes comprises substantially disc-shaped positive electrodes 203 enclosed in bag-like separators 202 and substantially disc-shaped negative electrodes 204, which are alternately stacked one upon the other in order to form a substantially cylindrical stack having a certain height or thickness. The stack comprises a negative electrode at both of end surfaces, a first negative electrode 204' being adjacent to the lid 201 and a last negative electrode 204" being placed at the other end of the stack. The negative electrodes 204 are both side coated electrodes. The negative electrodes 204' and 204" preferably are single side coated electrodes, the blank metallic sides facing the lid 201 and the tape 205, respectively. In another embodiment, the blank metallic side of the negative electrodes 204' and 204" may comprise a conductive coating with carbon, structured as amorphous, crystalline, or graphene.

Figure 2:
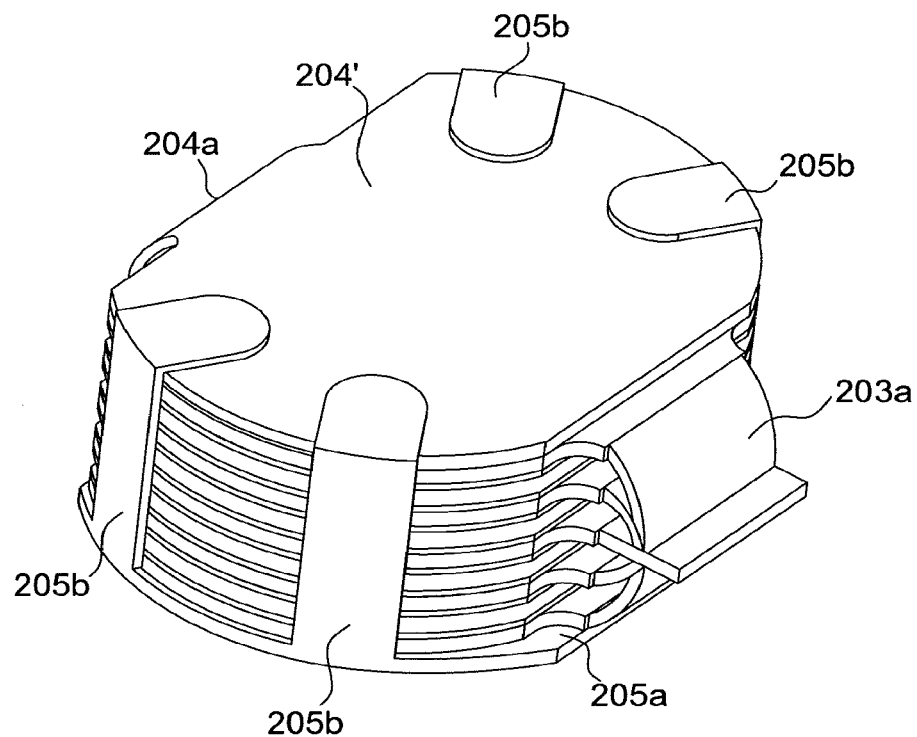
FIG. 2 is a perspective view of an assembly of stacked electrodes packed with the insulating packing tape of the invention viewed from the welded positive contact tabs side.

As shown by FIG. 2, each positive electrode 203 comprises a protruding positive contact tab 203a which is designed to lead contact to the cup 208. Preferably, all of the positive contact tabs 203a are welded together in order to electrically connect together the positive electrodes 203 to the cup 208 via a positive contact element, and more specially an additional positive contact tab 206, as explained below.

Figure 3:
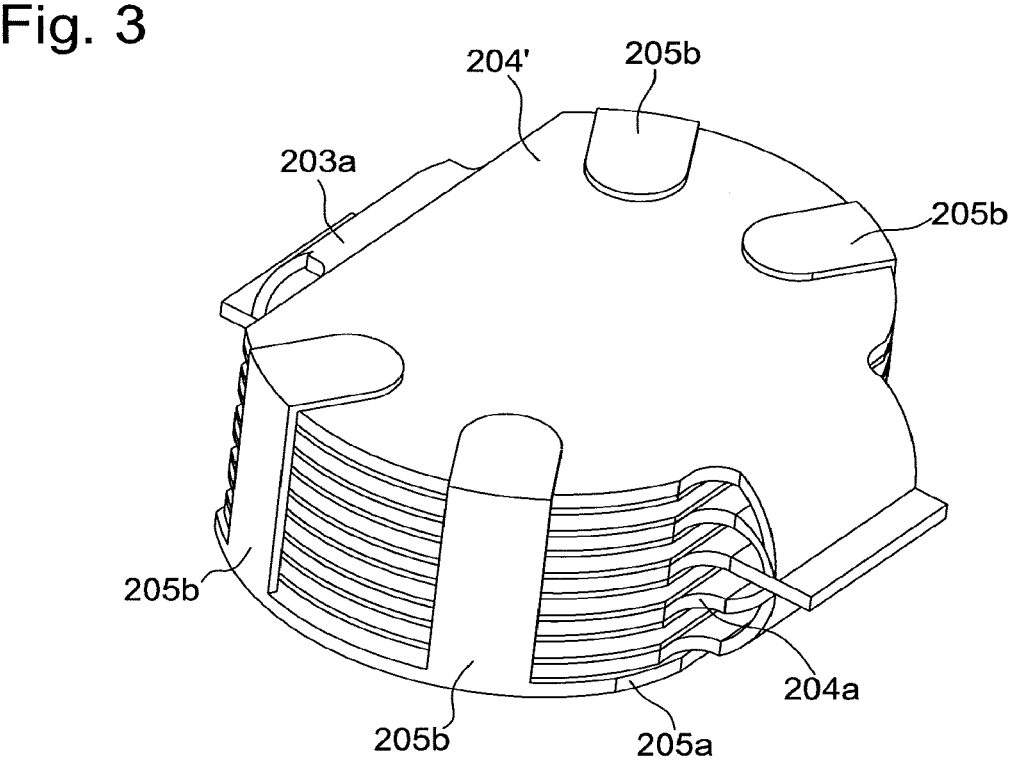
FIG. 3 is a perspective view of an assembly of stacked electrodes packed with the insulating packing tape of the invention viewed from the welded negative contact tabs side.

As shown by FIG. 3, each negative electrode 204 comprises a protruding negative contact tab 204a which is designed to lead contact to the lid 201. Preferably, all of the negative contact tabs 204a are welded together in order to electrically connect together the negative electrodes 204 to the lid 201 via the first negative electrode 204'.

As shown in the figures, the positive 203 and negative 204 electrodes are stacked with the positive contact tabs 203a of the positive electrodes 203 being located on one side of the assembly of stacked electrodes and the negative contact tabs 204a of the positive electrodes 204 being located for example on the opposite side of the assembly of stacked electrodes.

Such components of a coin cell with stacked electrodes are known to one skilled in the art and need no further detailed explanation.

According to the present invention, the coin cell 200 further comprises a insulating packing tape 205 comprising an insulator basis 205a and, in this preferred shown embodiment, four packing flaps 205b extending symmetrically from either side of the insulator basis 205a. Obviously the packing flaps 205b may comprise for example only one packing flap designed to be arranged around the stacked electrodes or any other appropriate number of packing flaps.

The insulating packing tape 205 should be placed in such a way that the insulator basis 205a is between the assembly of stacked electrodes and one of the cases to avoid electrical contact between the assembly of stacked electrodes and said case and the packing flaps 205b hold the assembly of stacked electrodes to form a compact electrode pack 209.

More particularly, the insulating packing tape 205 is placed in such a way that the insulator basis 205a is between the last negative electrode 204" and the cup 208 in order to avoid the electrical contact between said last negative electrode 204" and the cup.

The packing flaps 205b are folded along the height or the thickness of the assembly of stacked electrodes and folded back against the first negative electrode 204' to hold and pack said assembly of stacked electrodes tightly, as shown by FIGS. 2 and 3.

In this preferred shown embodiment, the insulator basis 205a and the packing flaps 205b form one piece. Obviously the packing flaps 205b may be manufactured separately and then being made integral with or attached to the insulator basis 205a by any suitable means known to one skilled in the art.

The insulator basis 205a and the packing flaps 205b comprise a substrate made of a material selected from the group comprising polyesters, polyolefins, polyimides, fluoropolymers, vinyl polymers, and an adhesive layer facing the assembly of stacked electrodes. Said adhesive layer is made of a material selected from the group comprising rubber-based material, acrylic-based material and silicone-based material. Obviously, in other embodiments, the adhesive layer may be provided only on the packing flaps 205b on its side facing the assembly of stacked electrodes.

In a preferred embodiment, the insulating packing tape 205 is made of Kapton® which comprises a polyimide substrate and an acrylate adhesive layer.

The shape of the insulating packing tape 205 can be designed according to the form of the positive and negative electrodes. Preferably, the insulator basis 205a has a larger area than the facing last negative electrode 204" of the assembly of stacked electrodes, in order to minimize a short circuit risk from contacting the last negative electrode 204" and cup 208.

The coin cell 200 further comprises a metallic positive contact element, for example an additional metallic positive contact tab 206, placed between the insulating packing tape 205 and the cup 208, said additional positive contact element or tab 206 being arranged to lead contact between the positive electrodes 203 to said cup 208. Said additional positive contact element or tab 206 is arranged to be welded with the other positive contact tabs 203a. In another embodiment the contact element may have a disc form, corresponding to the disc-shaped positive electrodes 203.

The coin cell 200 of the invention is assembled by a method comprising the step of:

stacking together alternatively the positive electrodes 203 and the negative electrodes 204', 204, 204" by placing a separator 202 in-between them to form an assembly of stacked electrodes, packing the assembly of stacked electrodes with said insulating packing tape 205, welding the negative contact tabs 204a together, and the positive contact tabs 203a with the additional positive contact element or tab 206 together, filling said obtained assembly of stacked electrodes with electrolyte, placing the obtained assembly of stacked electrodes in the lid 201 and the cup 208, assembling the lid 201 and the cup 208 by pressing the lid 201 into the gasket 207 to close the coin cell 200.

The sequence of the step of filling the obtained assembly of stacked electrodes with electrolyte and the step of placing the obtained assembly of stacked electrodes in the lid 201 and the cup 208 can be operated in this order, as written, or in other order.

The packing step comprises a step of placing the insulator basis 205a of the insulating packing tape 205 facing the final negative electrode 204" of the assembly of stacked electrodes and a step of folding the packing flaps 205b of the insulating packing tape 205 along the height of the assembly of stacked electrodes and back against the first negative electrode 204' to hold tightly the assembly of stacked electrodes.

Figure 4:
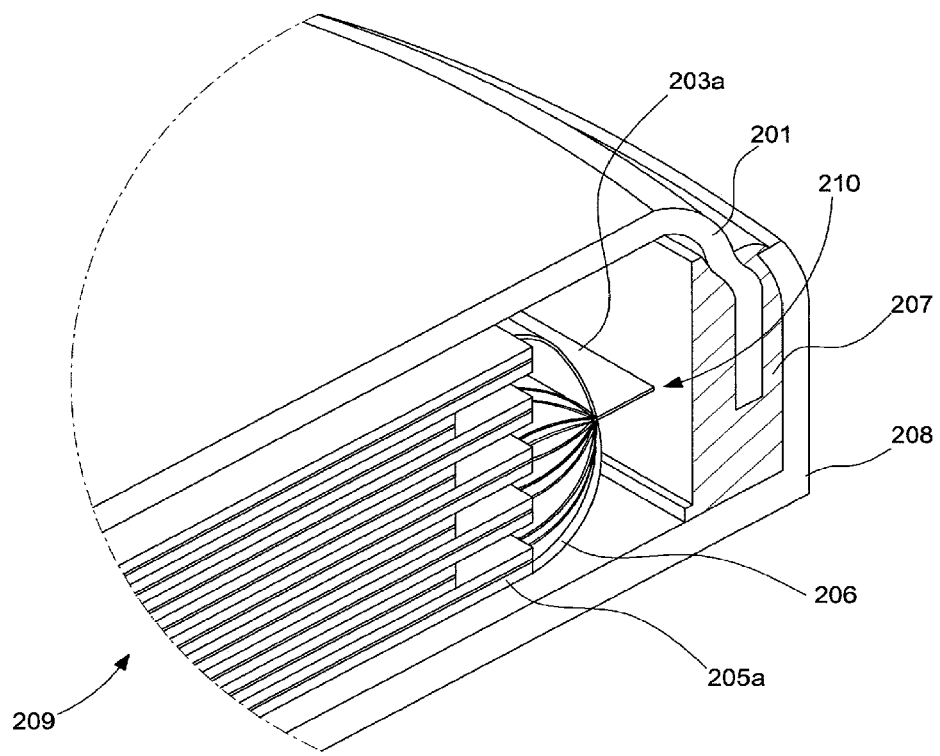
FIG. 4 is a cross section of a coin cell of the invention viewed from the welded positive contact tabs side.

Inside the coin cell 200, as shown by FIG. 4, the negative electrodes 204 are directly connected to the lid side via the negative contact tabs 204a and the first negative electrode 204', and insulated from the cup side by the Katpon® insulator basis 205a. The positive electrodes 203 are connected to the cup side via the positive contact tabs 203a and the additional positive contact element or tab 206. The whole electrode stack is hold by the Kapton® packing flaps 205b.

The coin cell of the invention requires fewer components than the coin cells of the prior art by using a multi-functional tape to pack layers of electrodes together and insulate them from metallic case of the battery.

Moreover, the process for manufacturing the coin cell of the invention is more efficient: indeed, as the whole electrode stack is hold by the multi-functional Kapton® insulating packing tape 205 and forms a compact electrode pack 209, the electrode stack is pre-assembled and can be placed easily directly in the cases of the coin cell, in only one step. The additional positive contact element or tab 206 is easily placed under the insulator basis 205a. Moreover, the insulating packing tape 205 allows to isolate the assembly of stacked electrodes from the gasket 207, in such a way that it has more secured anti-leakage. The insulating packing tape 205 used in the invention is therefore a reliable and safe element in the coin cell.

What is claimed is:

1. A coin cell comprising two cases designed to form a housing, an assembly of stacked electrodes placed inside the housing and comprising at least one positive electrode, at least one negative electrode, and at least one separator placed in-between them, wherein said coin cell further comprises a insulating packing tape comprising an insulator basis and at least one packing flap integral with the insulator basis, said insulating packing tape being placed in such a way that the insulator basis is between the assembly of stacked electrodes and one of the cases to avoid electrical contact between the assembly of stacked electrodes and said case and the packing flap holds the assembly of stacked electrodes to form an electrode pack.

2. The coin cell according to claim 1, wherein at least the packing flap comprises an adhesive layer facing the assembly of stacked electrodes.

3. The coin cell according to claim 2, wherein said adhesive layer is made of a material selected from the group comprising rubber-based material, acrylic-based material and silicone-based material.

4. The coin cell according to claim 1, wherein the insulator basis and the packing flap comprise a substrate made of a material selected from the group comprising polyesters, polyolefins, polyimides, fluoropolymers, and vinyl polymers.

5. The coin cell according to claim 1, wherein the insulator basis and the packing flap form one piece.

6. The coin cell according to claim 1, wherein the insulating packing tape comprises at least two packing flaps extending from either side of the insulator basis, said packing flaps being folded along the height of the assembly of stacked electrodes and folded back against said assembly of stacked electrodes to hold it.

7. The coin cell according to claim 6, wherein the insulating packing tape comprises at least two packing flaps extending symmetrically from either side of the insulator basis.

8. The coin cell according to claim 1, wherein the insulator basis has a larger area than a facing electrode of the assembly of stacked electrodes.

9. The coin cell according to claim 1, wherein it further comprises a contact element placed between the insulating packing tape and the case which is adjacent to said insulating packing tape, said contact element being arranged to lead contact between at least one of the positive or negative electrodes to said case.

10. A method for producing a coin cell comprising two cases designed to form a housing, an assembly of stacked electrodes placed inside the housing and comprising at least one positive electrode, at least one negative electrode, and at least one separator placed in-between them, wherein said method comprises the step of:

stacking together alternatively a positive electrode and a negative electrode by placing a separator in-between them to form an assembly of stacked electrodes, packing the assembly of stacked electrodes with an insulating packing tape comprising an insulator basis and at least one packing flap integral with the insulator basis, said insulating packing tape being placed in such a way that the insulator basis is between the assembly of stacked electrodes and one of the cases to avoid electrical contact between the assembly of stacked electrodes and said case and the packing flap holds the assembly of stacked electrodes to form an electrode pack, filling said obtained assembly of stacked electrodes with electrolyte, placing the obtained assembly of stacked electrodes in the cases, assembling the cases.

11. The method according to claim 10, wherein the packing step comprises a step of placing the insulator basis of the insulating packing tape facing an end electrode of the assembly of stacked electrodes and a step of folding the packing flap of the insulating packing tape along the height of the assembly of stacked electrodes and back against said assembly of stacked electrodes to hold it.

12. The method according to claim 11, wherein at least the packing flap comprises an adhesive layer facing the assembly of stacked electrodes.

13. The method according to claim 12, wherein said adhesive layer is made of a material selected from the group comprising rubber-based material, acrylic-based material and silicone-based material.

14. The method according to claim 10, wherein the insulator basis and the packing flap comprise a substrate made of a material selected from the group comprising polyesters, polyolefins, polyimides, fluoropolymers, and vinyl polymers.

15. The method according to claim 10, wherein the insulator basis and the packing flap form one piece.

16. The method according to claim 10, wherein the insulating packing tape comprises at least two packing flaps extending from either side of the insulator basis, said packing flaps being folded along the height of the assembly of stacked electrodes and folded back against said assembly of stacked electrodes to hold it.

17. The method according to claim 10, wherein the insulator basis has a larger area than a facing electrode of the assembly of stacked electrodes.

18. The method according to claim 10, wherein a contact element is further placed between the insulating packing tape and the case which is adjacent to said insulating packing tape, said contact element being arranged to lead contact between at least one of the positive or negative electrodes to said case.

* * * * *